United States Patent
Perchlik et al.

(10) Patent No.: US 10,534,412 B2
(45) Date of Patent: Jan. 14, 2020

(54) CONTROL OF TEMPERATURE IN A USB TYPE C SOURCE THROUGH RE-NEGOTIATION OF POWER DELIVERY OBJECT

(71) Applicant: Astronics Advanced Electronic Systems Corp., Kirkland, WA (US)

(72) Inventors: David Perchlik, Redmond, WA (US); Reid Adriance, Mill Creek, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 99 days.

(21) Appl. No.: 15/863,230

(22) Filed: Jan. 5, 2018

(65) Prior Publication Data

US 2018/0232021 A1 Aug. 16, 2018

Related U.S. Application Data

(60) Provisional application No. 62/459,679, filed on Feb. 16, 2017.

(51) Int. Cl.
*G06F 1/00* (2006.01)
*G06F 11/30* (2006.01)
(Continued)

(52) U.S. Cl.
CPC .............. *G06F 1/203* (2013.01); *G06F 1/206* (2013.01); *G06F 1/266* (2013.01); *G06F 1/3206* (2013.01);
(Continued)

(58) Field of Classification Search
None
See application file for complete search history.

(56) References Cited

U.S. PATENT DOCUMENTS 7,421,623 B2  9/2008  Haugh
8,244,296 B2  8/2012  Dorsey et al.
(Continued)

FOREIGN PATENT DOCUMENTS

WO   WO 2017/044718   3/2017

OTHER PUBLICATIONS

Extended European Search Report and Written Opinion in related application EP 18156927.8, dated Jul. 3, 2018, 8 pages.
(Continued)

*Primary Examiner* — Nitin C Patel
(74) *Attorney, Agent, or Firm* — Wiggin and Dana LLP; Gregory S. Rosenblatt; Abraham Kasdan (57) ABSTRACT

A system to regulate the temperature of a Source Port that includes a Port Controller having a first source power capabilities list stored thereon in a non-transitory digital media, the source capabilities list identifying a plurality of first power delivery capabilities that, based on their power requirements, may be negotiated by the Port Controller, a temperature sensor that measures a temperature of the power system and communicates that measured temperature to a comparator. The comparator compares the measured temperature to predefined limit temperatures and when the measured temperature crosses a predefined limit temperature threshold, the first source capabilities list being replaced with a second source capabilities list identifying a plurality of second power capabilities that, based on their power requirements, may be connected to the Source Port.

7 Claims, 7 Drawing Sheets

(51) Int. Cl.
*G06F 1/20* (2006.01)
*G06F 1/3206* (2019.01)
*G06F 13/38* (2006.01)
*G06F 13/40* (2006.01)
*G06F 1/26* (2006.01)
*G06F 13/42* (2006.01)
*G06F 1/3234* (2019.01)
*G06F 1/3215* (2019.01)

(52) U.S. Cl.
CPC ........ *G06F 13/385* (2013.01); *G06F 13/4068* (2013.01); *G06F 13/4282* (2013.01); *G06F 1/325* (2013.01); *G06F 1/3215* (2013.01); *G06F 2213/0016* (2013.01); *G06F 2213/0042* (2013.01); *G06F 2213/3812* (2013.01); *G06F 2213/4002* (2013.01)

(56) References Cited

U.S. PATENT DOCUMENTS

| | | |
|---|---|---|
| 2010/0285828 A1 | 11/2010 | Panian et al. |
| 2013/0063098 A1* | 3/2013 | Knowlton ............. H02J 7/0091 |
| | | 320/137 |
| 2014/0268563 A1* | 9/2014 | Sagneri .............. H05K 7/20909 |
| | | 361/692 |
| 2014/0325245 A1 | 10/2014 | Santini |
| 2015/0277461 A1* | 10/2015 | Anderson ................. H02J 1/14 |
| | | 307/32 |
| 2018/0067530 A1* | 3/2018 | Hsieh ........................ G06F 1/22 |
| 2018/0143674 A1* | 5/2018 | Card ....................... G06F 1/266 |
| 2018/0203497 A1* | 7/2018 | Sagneri ................... G06F 1/206 |

OTHER PUBLICATIONS

Hyde, John et al., AN96527, "Designing USB Type-C Products Using Cypress's CCG1 Controllers," Cypress Semiconductor Corporation, Jun. 2015.

* cited by examiner

CONTROL OF TEMPERATURE IN A USB TYPE C SOURCE THROUGH RE-NEGOTIATION OF POWER DELIVERY OBJECT

CROSS-REFERENCE TO RELATED PATENT APPLICATIONS

This patent application claims a benefit to the Feb. 16, 2017 filing date of U.S. Provisional patent application Ser. No. 62/459,679 titled, "Control of Temperature through Re-Negotiation of Power Delivery Capabilities." The disclosure of U.S. 62/459,679 is incorporated by reference herein in its entirety.

BACKGROUND OF THE DISCLOSURE

USB (Universal Serial Bus) Type-C cables, plugs, and receptacles form a standardized electrical interconnection for transmitting electrical power and data. In part, the USB Type-C (USB-C) standard covers a 24 pin fully reversible plug and mating receptacle, referred herein as a USB-C connector. The USB-C standard also covers captive and plug-in cables. USB-C cables are used to connect power sources, such as a power supply in a cabin for an aircraft, to Personal Electronic Devices (PEDs) such as computers, tablets and smart phones.

The standardized Universal Serial Bus Power Delivery specification (USB PD) includes an ability to negotiate power contracts between a power source and a power sink such as a PED. Power contracts are established when the power source advertises a set of source capabilities, the power sink choses one capability, and then the power source confirms the power sink's choice. The capabilities are defined by data structures called Power Data Objects or Augmented Power Data Objects, referred to herein as PDOs. Under USB PD specifications, PDOs may specify a variety of power source characteristics. Such characteristics include a fixed output, a battery-powered output and programmable outputs. The outputs typically have voltages up to 20V, currents as high as 5 A, and resulting power levels up to 100 W. By advertising different PDOs, the power source can control the maximum power drawn by a power sink.

The following definitions are commonly employed with USB PD specifications and are applied herein:

Power Supply—An electronic device that converts one form of electrical energy to another. As disclosed herein, the power supply converts electrical energy to a USB-C PD specified voltage and current level.

Port Controller—A device that handles the communication in and out of a source port or sink port and the computing resources allocated to managing the port.

Source Port—A functional block of circuits that comply with the USB-C and USB PD specifications to provide power. The source port includes a power supply and a port controller Sink Port—A functional block of circuits that comply with the USB-C and USB PD specifications that use power provided by a source port.

All USB source ports dissipate heat, and therefore have internal temperatures and surface temperatures that exceed the ambient temperature. For safety reasons, a typical USB source port will disable the output if an internal temperature reaches a pre-determined limit. While this provides safety protection, it can be an inconvenience to a user of the source port, such as the owner of a PED. Disclosed herein are a system and a method to negotiate the power level of a USB PD capable source port, to keep the internal temperature within safe limits without having to disable the output.

One example of negotiated power levels is found in United States Patent Application Publication No. 2010/0285828 A1, titled "Throttling Transmit Power in a WWAN Device Based on Thermal Input," by Panian et al. This publication discloses a wireless wide area network (WWAN) communication system having access terminals located remotely from a base station. A temperature sensor determines an expected increase in temperature in an access terminal based on a target transmit power. A negotiating module then communicates with the base station to set the target transmit power sufficiently low to avoid overheating components of the access terminal.

SUMMARY OF THE DISCLOSURE

Disclosed herein is a system to regulate the internal temperature of a power source port. Components of the system include a connector electrically interconnecting the power source port and a power sink port; an output control routing a power supply output to the connector; a port controller having a plurality of source capabilities lists stored thereon in a non-transitory digital medium, each list identifying a different set of power source port capabilities that, based on their power requirements, may be advertised over a power delivery communication channel to the power sink port; one or more temperature sensors converting a measured temperature to an electrical signal and communicating the measured temperature to a comparator.

One feature of the system is that the comparator compares the measured temperature to predefined limit temperatures. When the measured temperature exceeds a predefined maximum limit temperature, the port controller advertises to the power sink port a source capabilities list with reduced electrical power to reduce internal temperatures. When the measured temperature is below a predefined minimum temperature, the port controller advertises to the power sink port a source capabilities list with increased electrical power. This feature maximizes the electrical power available from the power source port.

Another feature is that the connector may be a USB Type-C connector.

DETAILED DESCRIPTION

The system discloses a method to control temperature within a power source port by changing the capabilities list and using negotiated PDOs. The system uses one or more thermal measuring devices that compare measured temperatures to one or more limit temperatures, and initiates a re-negotiation of a power contract using a new set of PDOs to adjust the power delivered from a power source to an outlet, thereby controlling the heat dissipated inside the power source and outlet. This allows maximizing the available outlet power while maintaining internal temperatures at acceptable levels. The system utilizes measured temperatures to determine which PDOs can be negotiated by changing the capabilities list of the power source. In an alternative embodiment, the system utilizes a method where the power source port capabilities are based on calculated parameters instead of actual temperature measurements.

An exemplary USB-C power source port is installed in an aircraft cabin. USB-C power source ports in passenger aircraft cabins are often installed in seatbacks, under the seat, on the seat leg, or in the cabin wall, all locations with a limited capacity to dissipate heat. As the ambient temperature rises, internal power dissipation must be lowered to maintain acceptable internal and surface temperatures. Acceptable internal power dissipation changes with power demand and ambient temperature. In some cases, the internal power dissipation may be safely increased, allowing increased outlet power. Embodiments disclosed herein either measure the internal temperature or calculate the power dissipated to control the maximum negotiated power. Referencing FIG. 1, a power source port 1 provides power to a power sink port 10 via a USB-C connector 11, which may be implemented by any combination of receptacles, cables or captive cables allowed by USB-C. Within the power source port 1 are one or more temperature sensors 16 that measure the surface temperature of heat dissipating elements or the internal average temperature of power supply 20. The temperature sensors 16 are typically located in the power supply 20. In addition to seatbacks in a passenger aircraft, the system disclosed herein is useful for outlets installed in other vehicles, such as seatbacks or cabins for buses, cruise ships and trains. Other venues requiring a large number of outlets, such as auditoriums and theaters also benefit from this system.

Figure 1:
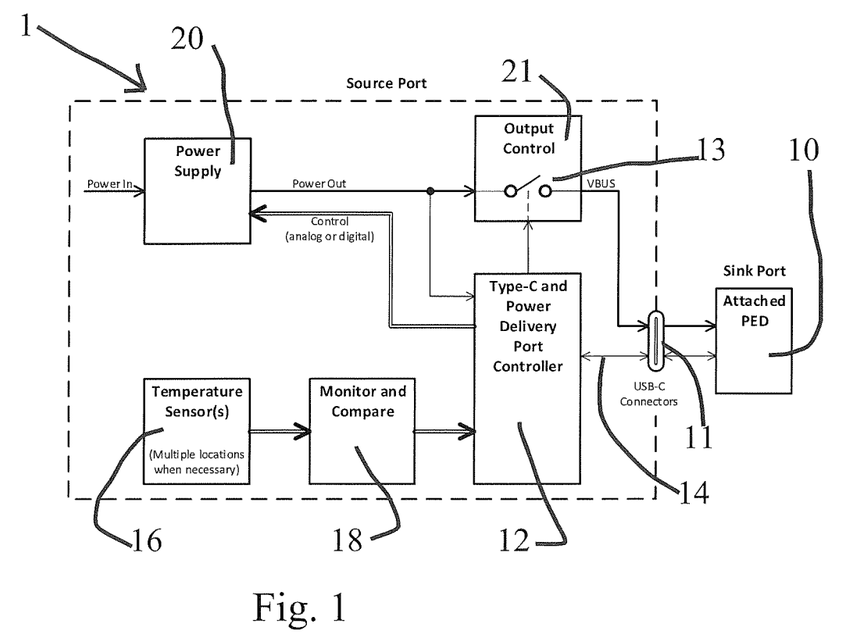
FIG. 1 illustrates a system for temperature control in block diagram form.

FIG. 1 illustrates a system for temperature control in block diagram form. When the switch 13 in output control 21 is closed, power from power supply 20 is conducted to USB-C connector 11. Power sink port 10 is a USB Type-C and USB PD capable PED. Representative PEDs connected to the USB-C connector 11 include smart phones, computing tablets, laptop computers, USB hubs and other portable electronic equipment. These devices typically require power in the range of from 5 W to 100 W. As power is delivered to the PED, heat is generated due to inefficiencies in the power supply 20, the output control 21 and the USB-C connectors 11. The power sink port 10, such as a PED, is in digital communication with a port controller 12 by way of power negotiation lines 14. The port controller 12 typically includes, but does not require, a dedicated microprocessor, and this block also represents the portion of any shared hardware or computing resources allocated to managing the power source port 10. Temperature sensor 16 measures the temperature of the power source port 1 as influenced by both ambient temperature and the internal power dissipation of the components within the power source port 1 and transmits the temperature measurements to a comparator 18 that compares the measured temperature to a pre-defined limit. Preferably, one temperature sensor 16 is positioned to measure the temperature on a surface of the functional element components inside the power source port 1 predicted to get the hottest.

Typically, for a passenger aircraft, an upper limit ambient temperature for the power source port is 35° C. and internal device maximum temperatures are limited by the design margin allowed against material and component manufacturer maximum ratings, generally 85° C. to 125° C.

Exemplary temperature sensors include thermistors, thermocouples, resistance thermometers and silicon bandgaps. The output from these sensors may be analog or digital.

The comparator 18 then transmits the temperature information to the port controller 12. A PDO driver circuit, having source capabilities lists stored therein in a non-transient digital memory, is implemented within either the comparator 18 or port controller 12.

An exemplary source capabilities list would contain:
5 Volts at 3 Amps for a power level of 15 Watts;
9 Volts at 3 Amps for a power level of 27 Watts;
15 Volts at 3 Amps for a power level of 45 Watts; and
20 Volts at 3 Amps for a power level of 60 Watts.

The PDO driver circuit then instructs the port controller 12 that based on its source capabilities list, which PDOs can be negotiated, via the negotiation lines 14, and connected to the power sink port 10 via the USB-C connectors 11.

The power supply 20 provides power to USB-C connectors 11 when the output control 21 switch 13 is closed. The output control 21 switch 13 is opened or closed by the port controller 12 based on the USB Type C specification and can be opened for safety situations such as over current or excessive temperature.

Figure 2:
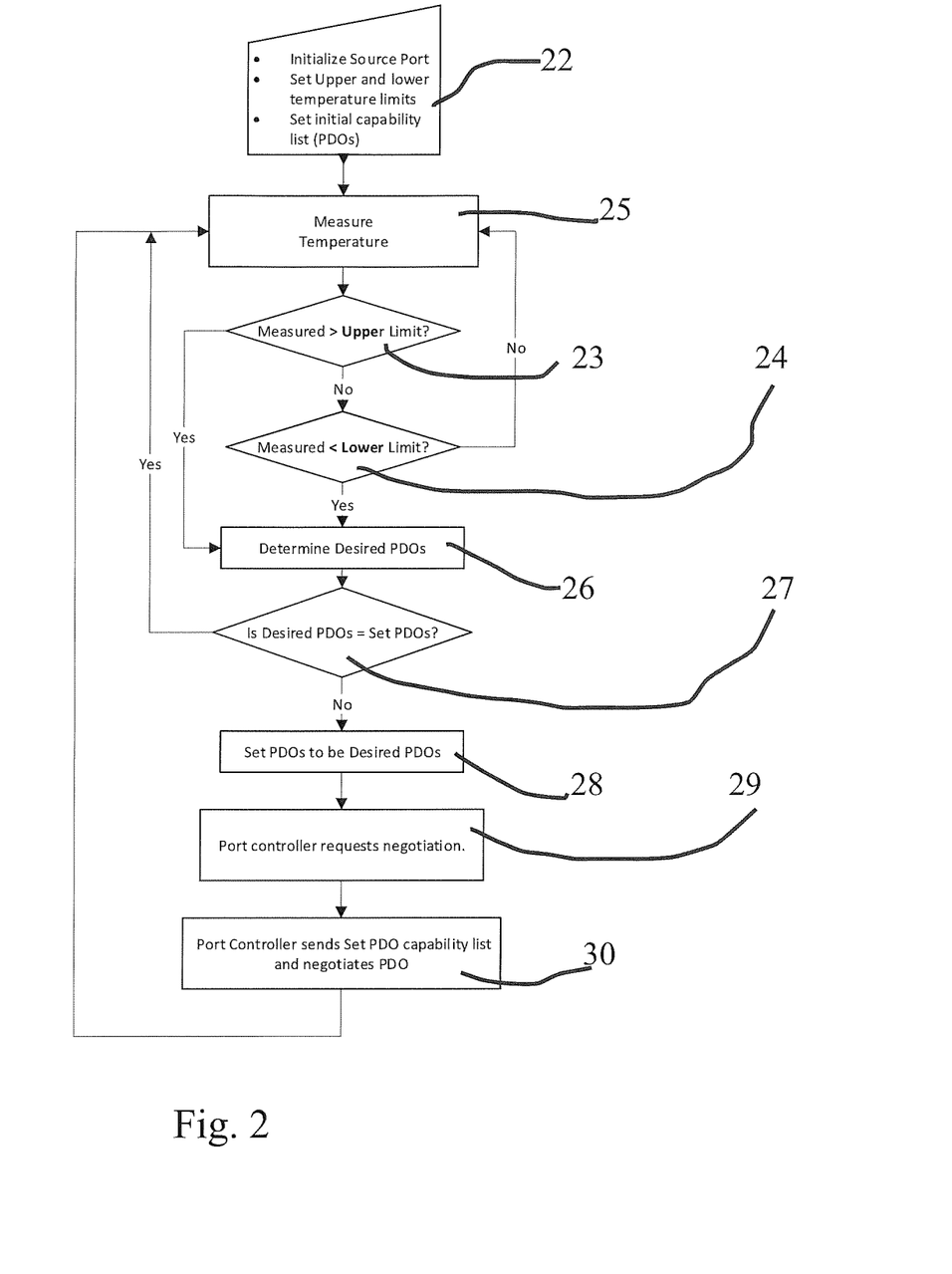
FIG. 2 illustrates a method to negotiate acceptable PDOs in flow chart designation.

FIG. 2 illustrates a method to negotiate acceptable PDOs in flow chart designation. At start up, the power source port is initialized 22. During initialization, the upper and lower temperature limits are set, the temperature limit values are communicated to comparators and an initial capability list (PDO) is set. The comparators previously received preset temperature limits determined by the manufacturer during product development to insure acceptable performance. Two temperature limits are specified during initialization, the upper limit is set as the maximum and a lower limit set to give hysteresis and determine when it is acceptable to increase the output power with an expanded set of PDOs.

A temperature sensor measures 25 the temperature of the power source port. A comparison 23 is made to determine if the measured 25 temperature exceeds the upper temperature limit. If the measured 25 temperature is greater than the upper limit, then the temperature is too high and corrective action to reduce the temperature is commenced. To reduce the temperature, a new capabilities list of PDOs is determined 26 and the new capabilities list of PDOs is set 28 as the PDO in the port controller. If the new capabilities list of PDOs is equivalent to the prior set of PDOs 27, no change is needed to the PDO capabilities list and the temperature is again measured 25.

If the measured 25 temperature is not greater than the upper limit, the temperature is compared 24 against the lower limit. If the measured 25 temperature exceeds the lower limit temperature, then no change is needed to the PDO and the temperature is measured 25 again. If the measured 25 temperature is less than the lower limit, than the power can be increased and a new capabilities list of PDOs is determined 26. If the new capabilities list of PDOs is not equal to the prior set of PDOs 27, the new capabilities list of PDOs becomes the set list of PDOs 28 and a new power contract is negotiated 29, 30 with the power sink port.

Figure 3:
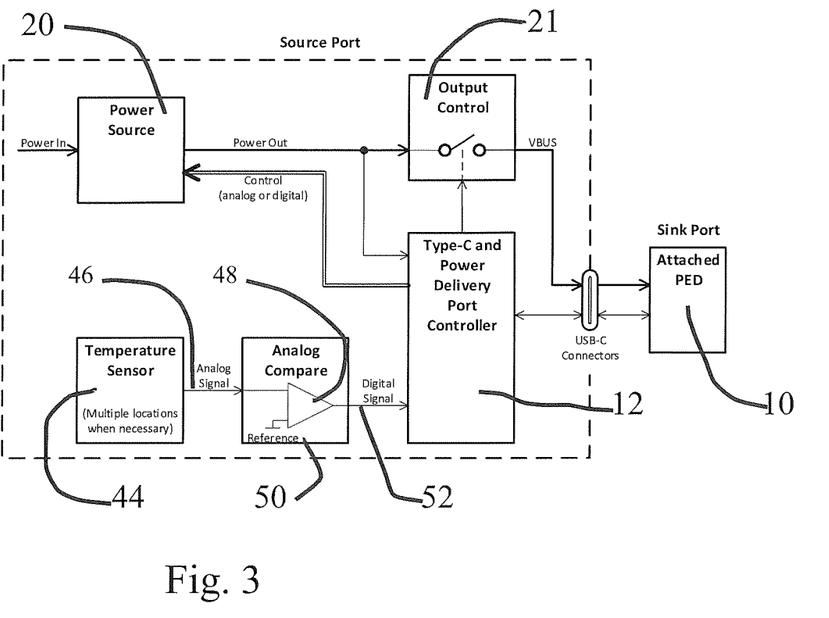
FIG. 3 is a block level electrical schematic of a USB Type-C connection with an Analog temperature compare function.

FIG. 3 is a block level electrical schematic of a USB-C connection having over-heating control that receives an analog signal from temperature sensor 44. There may be multiple temperature sensors required when there are more than one area of thermal concern such integrated circuits (ICs), switching magnetics and areas with human contact potential. An analog signal 46 is conducted to an analog comparator 48 and compared to the voltage that represents the maximum temperature of reference 50. A digital signal 52 transmits the comparison to port controller 12 for a determination if the temperature is within the preset limit. In one embodiment, the port controller 12 is a Cypress Semiconductor (San Jose, Calif.) CCG series of USB Type-C controllers.

Any of the above implementations could have multiple temperature sensors with each setting a different PDO or the digital temperature sensor outputs could be OR'ed together to change as little as one bit of the PDO codes. Output of the comparator could be connected to multiple codes as needed to select the appropriate PDO code. A second comparator could be used to set a lower PDO if the first lower PDO still has unacceptable measured temperature.

Alternatively, rather than using temperature sensors, an algorithm that models the power supply port uses measured electrical characteristics of the functional components to calculate temperature. Then, a processor running the algorithm then instructs the port controller to negotiate a new source capability:

Representative software code incorporating such an algorithm is:

```
PowerUp_Initialize( )  // Initialization includes set up for thermal calculations
    //Establish initial "Told" value representing the source
    // internal temp rise for nominal internal power dissipation.
. . .
while . . .        //Main loop with periodic execution
. . .
    GetOutputCurrent(. . .)//Measure output current
    CalcPowerDiss(. . .)    //Calculate source internal power dissipation using:
    // -Measured output current
    // -Known PDO output voltage
    // -Measured input voltage (optional)
    // -Possible table of efficiency adjustment factors
    CalcTempRise(. . .)    //Use difference equation to calculate estimated temp:
    // Tnew = Pwr*Theta/(B+1) + Told*B/(B+1) where
    // "Tnew", "Told" are temperature differences from inside
    // the source to an assumed external ambient temperature.
    // "Pwr" is the calculated/estimated internal power.
    // "Theta" is the effective steady state thermal impedance
    // from inside to outside the source enclosure.
    // "B" is the ratio of the product of the source Theta and
    // thermal capacity to the period of the main calculation loop.
    If Tnew > Tupper then LowerPDO(. . .)      //If calculated Tnew exceeds preset upper
        // temp limit, then execute routine to
        // negotiate lower power available to sink.
        // LowerPDO(. . .) checks against existing
        // PDO, to avoid unnecessary power
        //....renegotiation.
    If Tnew < Tlower then RaisePDO(. . .)      //If calculated Tnew drops below preset
        // lower temp limit, then execute routine to
        // negotiate higher power available to sink.
        // RaisePDO(. . .) checks against existing
        // PDO, to avoid unnecessary power
        //....renegotiation.
. . .
end while    //End of main loop
```

Figure 4:
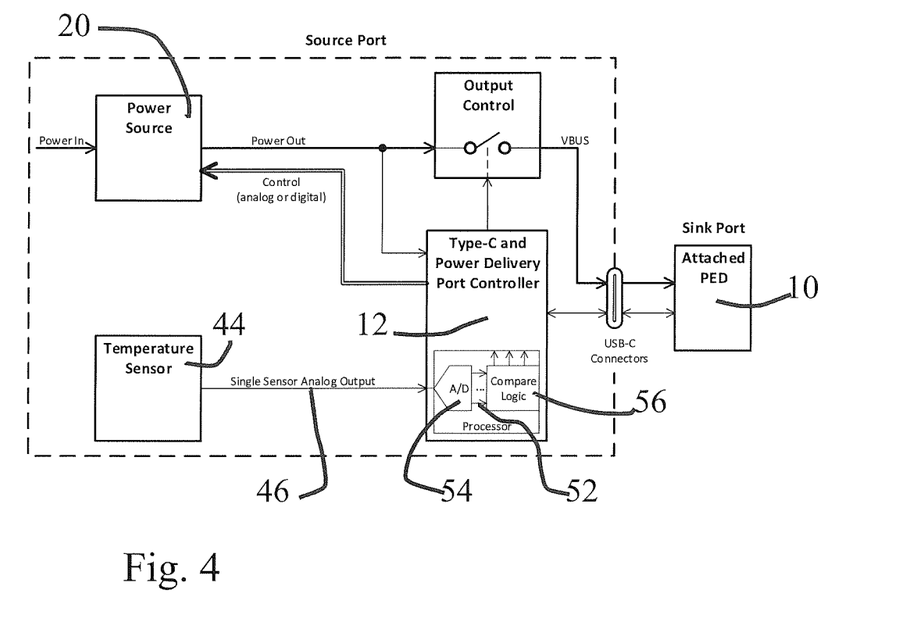
FIG. 4 is a block level electrical schematic of a USB Type-C connection with one or more temperature sensors, Analog to Digital conversion, and a logic block to compute desired PDOs.

FIG. 4 is a block level electrical schematic of a USB Type-C connection with one or more temperature sensors 44, Analog to Digital conversion 54, and a logic block 56 to compute desired PDOs. Analog signal 46 is converted to a digital signal 52 via analog to digital converter 54 that may be embedded within the port controller 12. In one embodiment the temperature sensor could be integrated into a microprocessor such as the Texas Instruments (Dallas, Tex.) TM4C123GH6PM.

Figure 5:
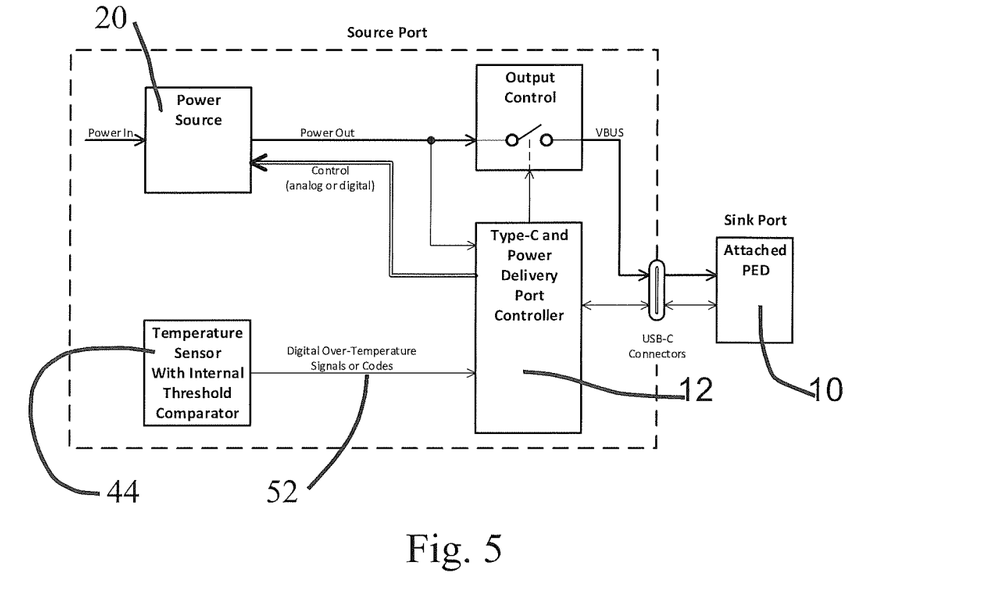
FIG. 5 is a block level electrical schematic of a USB Type-C connection where a sensor voltage output is compared to a reference and the PDO state is changed.

The schematic in FIG. 5 illustrates an implementation where temperature sensor 44 provides a voltage output signal as a digital signal 52 directly to port controller 12 where the signal is compared with a reference and PDO state is changed, if necessary.

Figure 6:
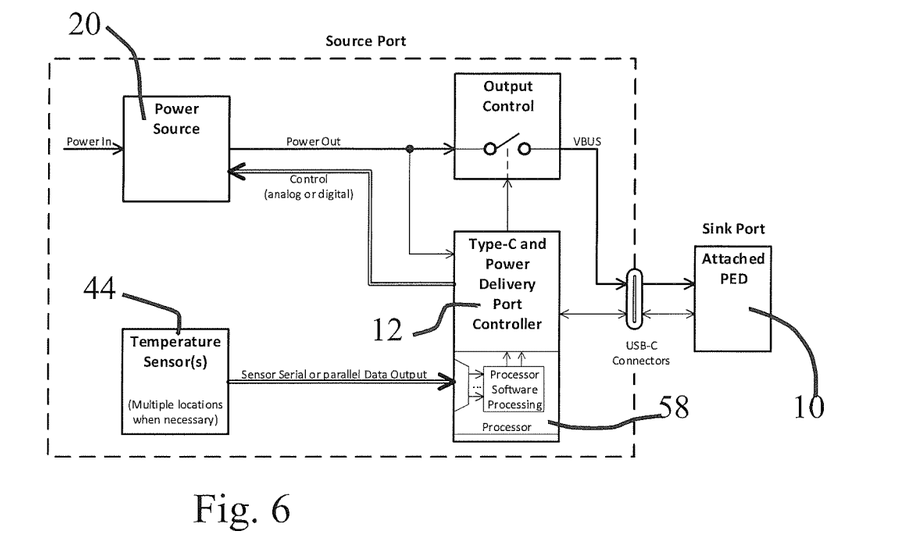
FIG. 6 is an electrical schematic illustrating an implementation with a change to one bit of the PDO codes.

The schematic in FIG. 6 shows another implementation similar to FIG. 5 except there is a separate digital IC processor 58 that receives the temperature sensor 44 data and evaluates the data and sends appropriate commands to the port controller 12.

While the combination of a USB-C outlet and a power sink is described above, the power negotiation system described above may be applied to other outlets and other power drawing systems.

EXAMPLES

An exemplary 100 W capable outlet has 90% constant efficiency. The calculated maximum power is 30 W at 50° C. The outlet would negotiate up to 100 W and start delivering power. A temperature sensor would monitor internal temperature and an electronic comparator circuit would detect when the sensor output has reached a pre-determined limit. The temperature sensor would send a signal to the port controller to re-negotiate a lower PDO. For this example, the PDO would renegotiate to a level that would result in an acceptable internal temperature.

Figure 7:
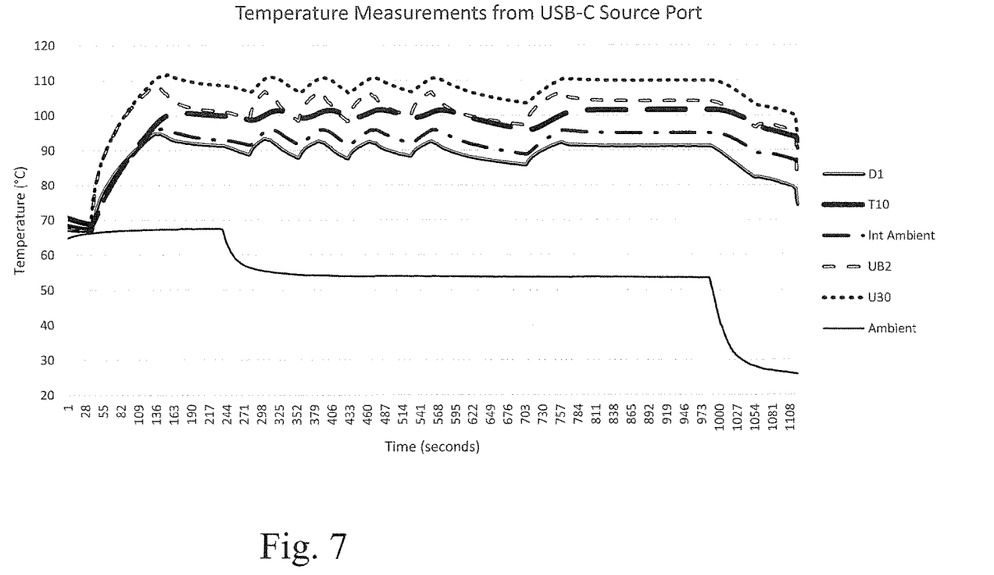
FIG. 7 illustrates a control of internal ambient temperature as a function of time.

FIG. 7 is a plot of temperature inside and outside a power source port. Temperature sensors were placed in several locations including the air temperature inside the housing of the power source port (Int Ambient) and on components (Q1, D1, T10, UB2, U30) along with the controlled air temperature outside of the power source port (Ambient).

FIG. 7 demonstrates the operation of the invention where the ambient temperature was increased above normal operation conditions and thus increasing the internal temperatures to undesirable levels at the default output power. At approximately time=125 seconds the output power was reduced. The reduction was accomplished with a renegotiation of the source port capabilities and negotiated PDOs. At this elevated ambient temperature the internal temperature was reduced over time as there was less power dissipated. When the temperature reached the lower threshold at approximate time=280 seconds, due to the lower power dissipation, the reduced ambient temperature allowed the output power to be increased. The increased power is a result of an increased power source port capability and a re-negotiated PDO. In this example, the internal temperature varies between the minimum threshold and the maximum threshold with the time in between dependent on ambient temperature and the amount of load drawn by the power sink port.

The invention claimed is:

1. A system to regulate the internal temperature of a power source port, comprising:
   a connector electrically interconnecting the power source port and a power sink port;
   an output control routing a power supply output to the connector;
   a port controller having a plurality of source capabilities lists stored thereon in a non-transitory digital medium, each list identifying a different set of power source port capabilities that, based on their power requirements, may be advertised over a power delivery communication channel to the power sink port;
   one or more temperature sensors converting a measured temperature to an electrical signal and communicating the measured temperature to a comparator; and
   the comparator comparing the measured temperature to predefined limit temperatures received from a digital non-volatile memory, wherein when the measured temperature exceeds a predefined maximum limit temperature, the port controller advertises to the power sink port a source capabilities list with reduced electrical power to reduce internal temperatures and when the measured temperature is below a predefined minimum temperature, the port controller advertises to the power sink port a source capabilities list with increased electrical power thereby maximizing the electrical power available from the power source port.

2. The system of claim 1 wherein the connector is a USB-C connector.

3. The system of claim 2 wherein the temperature sensor measures ambient temperature within the power source port.

4. The system of claim 2 wherein there are multiple temperature sensors disposed about the power source port with one of the temperature sensors measuring a temperature on a surface of a predicted hottest component of a functional element of the power source port.

5. The system of claim 2 wherein the temperature sensor is an electrical temperature sensor having an analog output selected from the group consisting of thermistor, thermocouple, resistance thermometer and silicon bandgap.

6. The system of claim 2 wherein the temperature sensor is an electrical temperature sensor having a digital output selected from the group consisting of thermistor, thermocouple, resistance thermometer and silicon bandgap.

7. The system of claim 2 wherein the comparator alternatively receives the predefined limit temperatures from a voltage source.

* * * * *